United States Patent Office 3,400,396
Patented Sept. 3, 1968

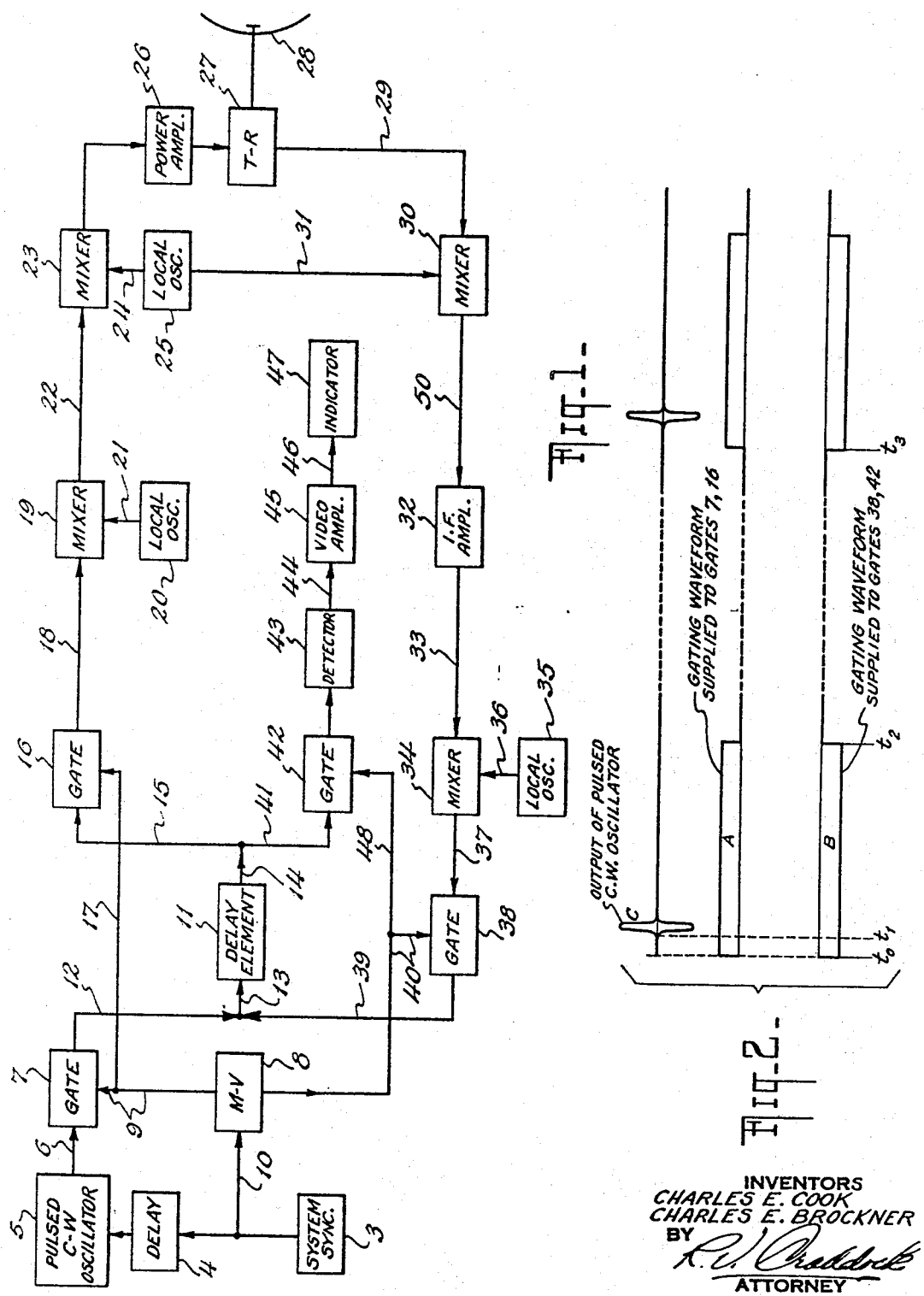

3,400,396
PULSE STRETCHING AND COMPRESSION
RADAR SYSTEM
Charles E. Cook, Farmingdale, and Charles E. Brockner, Amityville, N.Y., assignors to Sperry Rand Corporation, a corporation of Delaware
Filed Nov. 14, 1955, Ser. No. 546,599
11 Claims. (Cl. 343—17.1)

This invention relates to improvements in radar systems, and more specifically concerns a novel pulse-type radar system of large detection range and good target resolution.

One of a number of ever increasing demands on pulse-type radar system operation is to increase the detection range of the radar while maintaining a specified target resolution. This may be done by increasing the peak power transmitted. However, once the peak power limitation has been reached, nothing more may be done to increase the detection range except by increasing the average power by transmitting a wider pulse. This immediately violates the resolution specification, and cannot be done in an ordinary radar system.

In a copending U.S. application, Ser. No. 524,054, filed July 25, 1955, in the joint names of the present inventors, a radar system is described employing a pulse stretching filter in the transmitter portion of the system in addition to a pulse compression filter in the receiver portion. The pulse stretching filter passively transforms narrow fixed carrier frequency pulses into relatively wide frequency-swept pulses for transmission purposes. The pulse compression filter is complementary to the stretching filter in that it transforms the corresponding wide frequency-swept echo pulses into substantial replicas of the original narrow pulses for indication purposes. By this arrangement, echo pulses from targets that are in close proximity may be superimposed in part as received, yet are caused to provide individual indications on the indicator, thus affording good target resolution concurrently with the increased detection range obtained by transmitting pulses of high average power.

The present system accomplishes the results of the system described in the foregoing copending application, but employs a single delaying element, common to the transmitter and receiver portions, for passively frequency modulating narrow fixed carrier pulses and for performing the complementary pulse stretching and compressing performed by the individual transmitter and receiver filters of the copending application. Automatically functioning controls are provided for appropriately connecting the delaying element to the transmitter portion while disconnecting the same from the receiver portion, and vice-versa. An arrangement is also included for reversing the time sequence or progression of the swept frequencies in the echo pulse input to the delaying element relative to the frequency progression in the stretched output of the delaying element, so that the first echo pulse frequencies are delayed more than the last echo pulse frequencies, whereby to obtain the desired compression for indicating purposes.

A principal object of the present invention is to provide an improved radar system having both a large detection range and good target resolution.

Another object is the provision of a delaying element controlled successively to stretch a given narrow fixed carrier frequency pulse into a relatively wide frequency-swept pulse and to compress the wide frequency-swept pulse into a narrow pulse similar to the given pulse.

Another object is to provide an element in a radar system, which element is first connected into the transmitter portion of the sysem to stretch and passively frequency-modulate a relatively narrow fixed carrier frequency pulse for transmission purposes, and is subsequently disconnected and connected into the system's receiver portion to compress a corresponding reflected pulse for indication purposes.

Another object is the provision of an arrangement for reducing the number of variable delay elements required in a radar system employing passive pulse stretching and compression techniques.

With the foregoing and other objects in view, the present invention includes the novel elements and combinations and arrangements thereof described below and illustrated in the accompanying drawings, in which:

FIG. 1 is a block diagram of the present system; and,
FIG. 2 is an illustration depicting the timing of gating voltages suitable for actuating the gates depicted in FIG. 1 relative to the timing of pulses from the transmitter pulse source.

Referring to FIG. 1, a system timer or sync generator 3 is connected via a delay device 4 to a pulse source 5 preferably comprising a continuous wave oscillator repetitively pulsed at a low duty cycle by a blocking oscillator triggered by the delayed output of the sync generator. By this arrangement, pulse source 5 provides a series of low power narrow pulses at a fixed carrier frequency. The narrow pulse envelopes, moreover, contain relatively many carrier cycles and are rich in harmonic content predominantly over a given frequency spectrum centered about the carrier frequency.

The narrow pulses are fed from source 5 via a connection 6 to a normally closed gate 7 which is opened by a gating voltage supplied to gate 7 from a monostable multivibrator 8 via a connection 9. The multivibrator is triggered by the undelayed output of sync generator 3 obtained directly from the generator via a lead 10. Thus, sync generator 3 is adapted to open gate 7 prior to causing source 5 to produce a pulse on lead 6. The delay of device 4 and the time constant of multivibrator 8 are preferably such as to open gate 7 just prior to each pulse on lead 6 and to maintain gate 7 open for slightly more time than is necessary for each pulse to pass through a delaying element 11 connected to the output of gate 7 via a pair of connections 12, 13.

Delaying element 11 has a monotonically varying time delay vs. frequency characteristic. That is to say, it imparts a progressively different time delay to each of the different frequency components supplied thereto on its input connection 13. For the purposes of the present invention, it is immaterial whether delaying element 11 delays higher frequencies more than lower frequencies, or vice-versa. In either event, delaying element 11 will stretch the narrow pulse output of source 5 into a wider or longer duration pulse while simultaneously sweeping the frequency of the pulse from one end of the predominant spectrum of the pulse to the other end thereof. Hence, if delaying element 11 delays higher frequencies more than lower frequencies, the pulse output of source 5 will be stretched a given amount and passively frequency-modulated from the low end of its spectrum to the high end. And if element 11 delays the lows more than the highs, the pulse output of source 5 will be stretched the same amount but will be passively frequency-modulated from the high end of its spectrum to the low end.

The stretched and frequency-swept pulse output of delaying element 11 is fed via a pair of connections 14, 15 to a normally closed gate 16 which is opened by the gating voltage on the multivibrator output lead 9, obtained via a connection 17, in coincidence with the opening of gate 7. Gate 16 passes this output to a connection 18 between the gate 16 and a mixer 19, which mixer also receives the output of a continuous wave local oscillator 20 via a connection 21. Mixer 19 contains a side-band filter so that mixer 19 and oscillator 20 form a frequency changing circuit of the heterodyning type which changes each of the frequency components in the stretched and frequency-swept pulses obtained from delaying element 11 through gate 16 by a given amount. It is immaterial whether mixer 19 is constructed and arranged to produce the upper side-band resulting from its mixing action or the lower side-band. If the upper side-band is passed, the swept progression of the frequencies in the stretched pulse envelope appearing on the output connection 22 of mixer 19 will be in the same sense as that of the mixer input on connection 18. This sense, however, is reversed if the lower side-band is the one passed by mixer 19 assuming that the frequency of oscillator 20 is higher than the frequencies contained in the stretched pulse envelope. In either event, the width of the spectrum of the pulses leaving mixer 19 is the same as that of pulses entering the mixer, except that each of the frequencies is changed by an amount equal to the frequency of local oscillator 20.

Since in the usual case, the output frequency of a continuous wave oscillator may be stabilized with greater reliability in the neighborhood of a radar's intermediate frequency range as compared to the range of much higher frequencies generally employed for radar transmission, and since frequency stability is desirable in the present invention, both for obtaining an initial pulse having a given predominant spectrum and also for changing each of the frequencies in such spectrum by a given amount, the oscillator in source 5 and local oscillator 20 are preferably operated in the I.F. neighborhood. The system depicted in FIG. 1, therefore, may include an arrangement for raising the frequency level of the output of mixer 19 to one suitable for transmission. To this end, connection 22 is connected to a mixer 23 which is also connected via an input connection 24 to a transmission-frequency local C.W. oscillator 25. Each of the frequencies in the changed frequency output of mixer 19 are thus increased by a fixed amount for radiation purposes, and are fed from mixer 23 to a power amplifier 26, thence through a transmit-receive switch 27 to a directional antenna 28 for radiating the high-energy content pulses in a directional beam toward a reflecting object. Amplifier 26 is preferably controlled by gating means responsive to the output of sync generator 3 so that the amplifier is operative only during such times that pulses are fed thereto from mixer 23. Transmit-receive switch 27 connects amplifier 26 to antenna 28 while pulses appear in the amplifier output and simultaneously disconnects the receiver portion of the radar system from the antenna. In the interval between transmitted pulses and while echo pulses are being received, transmit-receive switch 27 connects antenna 28 to the receiver portion and simultaneously disconnects the antenna from amplifier 26 in the transmitter portion of the system.

The returning echo pulses which are likewise relatively wide are applied from antenna 28 through transmit-receive switch 27 and a connection 29 to a mixer 30. Local oscillator 25 supplies a second input to mixer 30 via a connection 31, which input comprises the same continuous-wave oscillations that are fed to mixer 23 in the transmitter portion. The beat frequency output of mixer 30 consists of frequency-swept echo pulses, the frequency level of which is reduced to that of the pulses fed via connection 22 to mixer 23. And since the same local oscillator 25 is used for mixers 23 and 30, the swept progression of the I.F. frequencies in the output of mixer 30 is the same as that of the pulse input to mixer 22 irrespective of whether the upper or lower side band is selected in mixer 23.

The output of mixer 30 is fed via a connection 50 to an intermediate frequency amplifier 32, the output of which is then fed via a connection 33 to a mixer 34 where it is mixed with the output of a local C.W. oscillator 35 obtained by way of a connection 36. The frequency at which oscillator 35 operates and the side-band filtering of mixer 34 are such that the output of mixer 34 is frequency-swept over the same spectrum as is the pulse input to mixer 19, but the progression of such frequency sweeping is reversed in the output of mixer 34 relative to that of the input of mixer 19. In other words, the first frequencies in point of time in the stretched and frequency-swept input to mixer 19 are now the last frequencies in time in the output of mixer 34.

In accordance with the present invention, the progression of frequency sweeping is reversed by heterodyne action when the following two conditions are simultaneously met: (1) that the fixed frequency local oscillator is operating at a frequency higher than the frequencies contained in the frequency-swept signal, and (2) that the resulting lower side band is selected. It was previously mentioned, for example, that the progression of frequencies in the stretched pulsed envelope may or may not be reversed by the action of mixer 19, depending on which side band is selected therein, assuming that the frequency of oscillator 20 is higher than the frequencies contained in the stretched pulsed envelope.

It will be apparent that only one reversal of frequency progression is required in the operation of the apparatus of the present invention. Thus, if a frequency progression reversal was produced at the output of mixer 19, no further reversal is required of mixer 34. Mixer 34 can be adapted to preserve the progression of frequency sweep merely by failing to meet one or both of the above-mentioned two requirements for reversal.

The output of mixer 34 is fed via a connection 37 to a normally open gate 38 which passes such output to a connection 39 that couples gate 38 to the input connection 13 of delaying element 11. Gate 38 is closed in coincidence with the opening of gates 7, 16 in the transmitter portion of the system. To accomplish this, a gating voltage is obtained for gate 38 on a connection 40 to gate 38 from multivibrator 8, in synchronism with the gating voltage obtained from the multivibrator on leads 9 and 17, but having an opposite polarity so that when the normally closed gates 7, 16 are opened, the normally open gate 38 is closed.

Since the delaying element 11 progressively delays the frequencies at one end of the spectrum of its pulse input more than the other end thereof, and since the progression or time sequence of the frequencies fed to delaying element 11 on connection 39 from the receiver portion of the system is reversed with respect to that of the frequencies fed on connection 12 from the transmitter portion, the delaying element compresses the wide echo pulses it receives from receiver portion into narrow pulses similar to those originally supplied from source 5. The more nearly linear the time delay vs. frequency characteristic of delaying means 11 is, the more nearly the compressed output of delaying means 11 becomes a replica of the output of source 5. That is to say, with a linear characteristic, the total time delay imparted to each frequency component in its two-way passage through delaying means 11 is a given constant value, which is the criterion for non-distortion.

The compressed echo pulses on the output connection 14 of delaying element 11 are employed for target indication purposes. To this end, connection 14 is coupled via a connection 41 to a normally open gate 42 which passes the compressed output of the delaying element 11 to a detector 43. The detector transforms such output into video pulses. A connection 44 feeds the video pulses from detector 43 to a video amplifier 45, the output of which is fed via a connection 46 to an indicator 47. Indicator 47 may include a cathode ray tube adapted to respond to the amplified video pulses so as to indicate targets detected by the radar system.

The normally open gate 42 is closed in coincidence with the closing of gate 38 by means of the gating voltage on connection 40 received via a connection 48.

The timing of the gating voltages to gates 7, 16 and 38, 42 relative to that of the output of pulse source 5 is illustrated in FIG. 2. At time $t_0$, sync generator 3 (FIG. 1) triggers multivibrator 8 to produce the positive gating voltage A and the negative gating voltage B, both of which continue for a time $t_2$ dependent on the time constant of the multivibrator. Hence, for the interval $t_2$, the transmitter gates 7, 16 are open and the receiver gates are closed. Just after the interval $t_2$ commences, at a time $t_1$ determined by the delay of delay device 4 which couples sync generator 3 to pulse source 5, the syn generator output that triggered the multivibrator causes pulse source 5 to produce the narrow pulse C. Thus, when narrow C is generated, gates 7, 16 are open so as to route the pulse through delaying element 11 and transmitter mixers 19, 23 while gates 38, 42 are closed so as to prevent the pulse from entering the receiver portion of the system. The time constant of the multivibrator is preferably such that the difference between $t_1$ and $t_2$ is slightly more than the delay of delaying element 11 so that adequate time is provided for the pulse to get through the transmitter portion and the T-R switch 27 to antenna 28.

At $t_2$, the gates 7, 16 and 38, 42 revert to their respective normally closed and normally open conditions and remain in such respective conditions until a time $t_3$ just before the next succeeding pulse from source 5. The interval from $t_2$ to $t_3$ is relatively long due to the low duty cycle of source 5. If the transmitted pulse impinges upon a reflecting object, the corresponding echo pulse is routed through delay element 11 to indicator 47 by gates 38, 42 while being prevented from entering the transmitter portion of the system by gates 7, 16.

While the delaying element 11 has thus far been defined in terms of its characteristics, it will be clear to those skilled in the art that element 11 may readily take the form of a filter constructed and arranged to provide a progressively varying time delay to different frequencies in its input, at least over the predominant spectrum of the pulses supplied by source 5. On the other hand, element 11 may consist of a transmission line such as a wave guide or a coaxial line having some loss over the pulse spectrum. And with suitable adaptation, element 11 may even comprise a mercury delay line or a helix-type tube such as a traveling wave tube.

As already noted, frequency stability is desirable in the present system for providing the initial fixed carrier pulses of a given predominant spectrum and for providing the subsequently required frequency changes in such spectrum. Thus, if, in addition to using highly stable circuits in source 5 and local oscillators 20, 35 (see FIG. 1) a circuit of high stability is used in local oscillator 25, the present system may thereby be readily adapted for use as a moving target indicator (MTI). To this end, the narrow receiver pulse in connection 41 may be compared with the output of the C.W. oscillator in source 5 to determine the phase difference of the two signals. A variation of this phase difference from pulse to pulse will provide an indication of a moving target. The requisite stability in the various oscillators may be attained, for example, by phase-locking the same to the output of a reference oscillator or to selected harmonics of such output.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, means for generating a fixed carrier frequency pulse having a given predominant frequency spectrum, passive means coupled to said generating means for delaying the different frequency components in said fixed carrier pulse by different amounts so that said pulse is stretched in duration and is swept in frequency from one end of said spectrum to the other end, means responsive to said stretched and frequency-swept pulse for reversing the order of progression of the frequency components therein, and means for uncoupling said passive means from said generating means and coupling said reversing means to said passive means, whereby the pulse output of said reversing means may be compressed in duration by said passive means into a substantial replica of said fixed carrier frequency pulse generated by said generating means.

2. The combination of claim 1 wherein the passive means is a filter having a linearly varying time delay vs. frequency characteristic.

3. In combination, means for generating a fixed carrier frequency pulse of electrical energy having a given predominent frequency spectrum, passive means coupled to said generating means for imparting a linearly progressive time delay to each of the frequencies in the spectrum of said fixed carrier frequency pulse so as to simultaneously stretch said pulse and sweep the same in frequency over said spectrum, means for reversing the time sequence of the frequencies in said stretched pulse, and means for uncoupling said passive means from said generating means immediately following the stretching of said fixed carrier frequency pulse and simultaneously coupling said reversing means to said passive means, whereby to obtain a replica of said fixed carrier frequency pulse.

4. In a pulse-type radar system, means for periodically generating fixed carrier frequency pulses having a given predominant frequency spectrum, means adapted to be coupled to said generating means for delaying the different frequencies in said fixed carrier pulses by different amounts in a manner such that said pulses are stretched in duration and are swept in frequency from one end of said spectrum to the other end, first frequency-changing means adapted to be coupled to said delaying means for changing each of the frequencies in the stretched and frequency-swept pulses obtained from said delaying means by a first given amount, means coupled to said first frequency-changing means for transmitting the changed frequency pulses therefrom toward a reflecting object, means for receiving the corresponding pulses reflected from said object, second frequency-changing means coupled to said receiving means for changing each of the frequencies in said reflected pulses by a second given amount predetermined to provide resultant pulses having said given spectrum but with the frequencies therein swept from said other end of said spectrum to said one end thereof, means coupling the output of said second frequency-changing means to said delaying means, and means for periodically uncoupling said second frequency-changing means from said delaying means and simultaneously coupling said generating means and said first frequency-changing means to said delaying means so that each generated pulse is stretched by said delaying means for transmission and its corresponding reflected pulse is compressed by the same delaying means into a substantial replica of said generated pulse prior to the generation of the next succeeding pulse.

5. The system of claim 4 further including a pulse-responsive indicator, and means for coupling said indicator to the output of the delaying means only during such times that the second frequency-changing means is coupled to the input of said delaying means.

6. In a pulse-type radar system, means for generating periodic pulses of electrical energy, each of said pulses having a given predominant frequency spectrum encompassing a fixed carrier frequency, a delay element having a substantially linearly varying delay-vs. frequency characteristic over a spectrum including said given spectrum, means actuable to connect said pulse generating means to said delay element in input relation for obtaining a pulse output therefrom stretched in duration relative to the output of said generating means and frequency-swept over said given spectrum, first frequency-changing means adapted to change each of the frequency components in the stretched and frequency-swept pulses obtained from said delay element by a first given amount when said actuable means is actuated, means coupled to said first frequency-changing means for transmitting the changed frequency pulses therefrom toward a reflecting object, means for receiving corresponding pulses reflected from said object, second frequency-changing means coupled to said receiving means for changing each of the frequency components in said reflected pulses by a second given amount to provide pulses having said given frequency spectrum but with the order of progression of the frequencies within said spectrum reversed relative to their order as supplied to said first frequency-changing means, means coupling said second frequency-changing means to said delay element in input relation, and means for periodically actuating said actuable means and simultaneously uncoupling said second frequency-changing means from said delay element at the periodicity of said periodic pulses and for such intervals of time that each pulse generated by said generating means is stretched by said delay element for transmission and its corresponding reflecting pulse is compressed by the same delay element into substantially a replica of said generated pulse prior to the generation of the next succeeding pulse.

7. In a pulse-type radar system, means for generating periodic pulses of electrical energy having a fixed carrier frequency and having a major portion of their energy confined to a predetermined band of frequencies centered about said carrier frequency, a delay element having a substantially linearly varying delay vs. frequency characteristic over a given band of frequencies including said predetermined band, means actuable to connect said pulse generating means to said delay element in input relation for obtaining a pulse output therefrom stretched in duration relative to the output of said generating means and frequency-swept over said predetermined band of frequencies, first heterodyning means adapted when said actuable means is actuated to mix a continuous wave signal of a first preselected frequency with the stretched and frequency-swept pulse output of said delay device so as to provide a resultant pulse of equivalent band width having all of the frequency components of said stretched and frequency-swept output changed therein by an amount equal to said first preselected frequency, means connected to said first heterodyning means for transmitting the changed frequency output pulses thereof toward a reflecting object, means for receiving corresponding pulses reflected from said object, second heterodyning means connected to said receiving means for mixing with said reflected pulses a continuous wave signal of a second given frequency different from said first given frequency so as to provide resultant pulses with the swept progression of frequencies therein having its order reversed relative to the order of such progression in the stretched and frequency-swept pulse output of said delay element, means connecting said second heterodyning means to said delay element in input relation, and means for periodically actuating said actuable means and simultaneously opening the connection between said second heterodyning means and said delay element for successive intervals of predetermined duration having the periodicity of said periodic pulses, whereby a given fixed carrier pulse may be stretched and passively frequency-modulated by said delay element prior to transmission and the corresponding reflected pulse may be compressed by the same delay element to have substantially the same duration as said given fixed carrier pulse.

8. In a pulse-type radar system, means for generating periodic pulses of electrical energy having a fixed carrier frequency and having a major portion of their energy confined to a predetermined band of frequencies centered about said carrier frequency, a delay element having a substantially linearly varying delay vs. frequency characteristic over said predetermined band of frequencies, means actuable to connect said pulse generating means to said delay element in input relation for obtaining a pulse output therefrom stretched in duration relative to the output of said generating means and frequency-swept over said predetermined band of frequencies, first heterodyning means adapted when said actuable means is actuated to mix a continuous-wave signal of a first preselected frequency with the stretched and frequency-swept pulse output of said delay device so as to provide a resultant pulse of equivalent band with having all of the frequency components of said stretched and frequency-swept output changed therein by an amount equal to said first preselected frequency, means connected to said first heterodyning means for transmitting the changed frequency output pulses thereof toward a reflected object, means for receiving corresponding pulses reflected from said object, second heterodyning means connected to said receiving means for mixing with said reflected pulses a continuous-wave signal of a second preselected frequency different from said first preselected frequency by twice the amount of said carrier frequency so as to provide resultant pulses having said predetermined band of frequencies but with the swept progression of frequences therein having its order reversed relative to the order of such progression in the stretched and frequency-swept pulse output of said delay means, means connecting said heterodyning means to said delay element in input relation, and means for periodically actuating said actuable means and simultaneously opening the connection between said second heterodyning means and said delay element for successive intervals having the periodicity of said periodic pulses and a duration so that each fixed carrier pulse is stretched by said delay element and the reflected pulse corresponding thereto is compressed by the same delay means to substantially a replica of said fixed carrier pulse prior to the generation of the next succeeding pulse.

9. In a pulse-type radar system, means for generating periodic pulses of electrical energy having a fixed carrier frequency and having a major portion of their energy confined to a predetermined band of frequencies centered about said carrier frequency, a delay element having a substantially linearly varying delay vs. frequency characteristic over said predetermined band of frequencies, means actuable to connect said pulse generating means to said delay element in input relation for obtaining a pulse output therefrom stretched in duration relative to the output of said generating means and frequency-swept over said predetermined band of frequencies, first heterodyning means adapted when said actuable means is actuated to mix a continuous-wave signal of a first preselected frequency with the stretched and frequency-swept pulse output of said delay element so as to provide a resultant pulse of equivalent band width having all of the frequency components of said stretched and frequency-swept output increased therein by an amount equal to said first preselected frequency, means connected to said first heterodyning means for transmitting the increased frequency output pulses thereof toward a reflecting object, means for receiving corresponding pulses reflected from said object, second heterodyning means connected to said receiving means for mixing with said reflected pulses a continuous-wave signal of a second preselected frequency exceeding said first preselected frequency by twice the amount of said carrier frequency so as to provide resultant pulses having said predetermined band of frequencies but with the swept progression of frequencies therein having its order reversed relative to the order of such progression in the stretched and frequency-swept pulse output of said delay element, means connecting said second heterodyning means to said delay element in input relation, and means for periodically actuating said actuable means and simultaneously opening the connection between said second heterodyning means and said delay element for successive intervals having the periodicity of said periodic pulses and a duration so that each fixed carrier pulse is stretched by said delay element and the reflected pulse corresponding thereto is compressed by the same delay means to substantially a replica of said fixed carrier pulse prior to the generation of the next succeeding pulse.

10. A radar system comprising: means for generating fixed carrier frequency pulses, passive means coupled to said generating means for delaying the different frequency components of said fixed carrier frequency pulses by different amounts so that said pulses are stretched in duration and swept in frequency, means coupled to said passive means for transmitting said stretched and frequency-swept pulses, means for receiving echoes of said transmitted pulses, means for inverting the order of progression of the frequency components of said received pulses, and means for applying said inverted pulses to said passive means, whereby the inverted pulses are compressed in duration by said passive means.

11. A system comprising means for generating fixed carrier frequency pulses, passive means coupled to said generating means, said passive means having a transfer characteristic whose phase response is a function of frequency for delaying the different frequency components of said fixed carrier frequency pulses by different amounts so that said pulses are stretched in duration and swept in frequency, and means including passive means having substantially said transfer characteristic and responsive to said stretched and frequency-swept pulses for inverting the order of progression of the frequency components therein and compressing the duration of said stretched and frequency-swept pulses.

References Cited

UNITED STATES PATENTS

| | | | |
|---|---|---|---|
| 2,624,876 | 1/1953 | Dicke | 343—13 |
| 2,726,386 | 12/1955 | Camp | 343—17.1 |

RICHARD A. FARLEY, *Primary Examiner.*

C. L. WHITHAM, *Assistant Examiner.*